Figure 1:
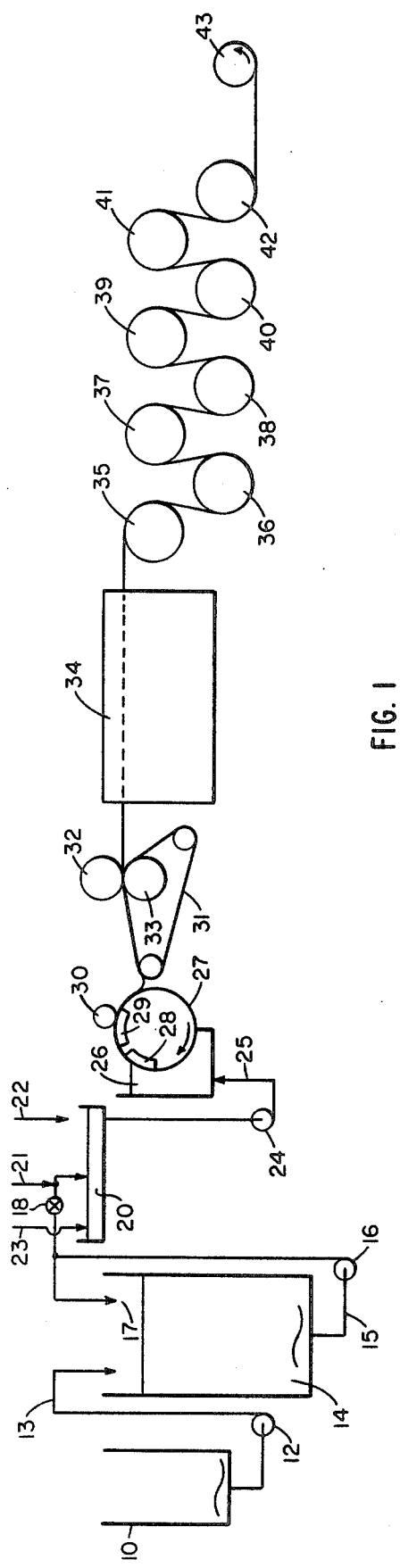

United States Patent [19]

O'Rell et al.

[11] 4,216,281
[45] Aug. 5, 1980

[54] BATTERY SEPARATOR

[75] Inventors: Dennis D. O'Rell, Boxboro; Nigel I. Palmer, Lexington, both of Mass.; Vu H. Nguyen, Hightstown, N.J.

[73] Assignee: W. R. Grace & Co., Cambridge, Mass.

[21] Appl. No.: 935,280

[22] Filed: Aug. 21, 1978

[51] Int. Cl.² ............................................. H01M 2/16
[52] U.S. Cl. ................................................... 429/252
[58] Field of Search ............................. 429/249–252; 260/896, 897 B

[56] References Cited

U.S. PATENT DOCUMENTS

| | | | |
|---|---|---|---|
| 2,734,095 | 2/1956 | Mears et al. | 429/252 X |
| 3,085,126 | 4/1963 | Labino | 429/252 |
| 3,247,025 | 4/1966 | Beaulieu et al. | 136/146 |
| 3,272,657 | 9/1966 | Zenczak | 136/148 |
| 3,351,495 | 11/1967 | Larsen et al. | 136/146 |
| 3,472,700 | 10/1969 | Kollman | 429/250 |
| 3,743,272 | 7/1973 | Nowotay | 264/69 |
| 3,784,413 | 1/1974 | Watanabe | 429/252 X |
| 3,891,499 | 6/1975 | Kato et al. | 162/157 R |
| 3,902,957 | 9/1975 | Kozlowski | 162/157 R |
| 3,915,750 | 10/1975 | Yetani et al. | 429/250 X |
| 3,920,508 | 11/1975 | Yonemori | 162/157 R |
| 3,987,139 | 10/1976 | Kozlowski | 264/141 |
| 3,995,001 | 11/1976 | Vroomans | 264/8 |
| 3,997,648 | 12/1976 | Davis et al. | 264/140 |
| 4,007,247 | 2/1977 | Ballard | 264/140 |
| 4,024,323 | 5/1977 | Versteegh | 429/249 |

FOREIGN PATENT DOCUMENTS 2509823  9/1975  Fed. Rep. of Germany .

Primary Examiner—Charles F. Lefevour
Attorney, Agent, or Firm—C. Edward Parker; Edward J. Hanson, Jr.

[57] ABSTRACT

A battery separator is provided that has 30–70% polyolefin synthetic pulp, 15–65% siliceous filler and 1–35% by weight of long fibers having lengths of between ¼ and 1 inch. The long fibers may be polyester fibers or glass fibers or a mixture. Cellulose may be included in an amount up to about 10%.

A process for forming the battery separator is also revealed using standard paper making equipment but employing ionic copolymers containing acrylamide in cationic and anionic combination to give good affinity of the siliceous material and polyolefin. Alum and other processing aids are also included as are other procedural steps such as pressing the web.

3 Claims, 1 Drawing Figure

BATTERY SEPARATOR

BACKGROUND OF INVENTION

Battery separators are porous diaphragms placed between the positive and negative plates of a battery so that the batteries electrolyte forms the sole internal conductive path between the positive and negative plates. It is generally considered desirable to employ separators which have the smallest pore size since this will retard the rate of active material from the battery plates penetration into and through the separator thereby causing shorting between the positive and negative plates.

Battery separators which are commonly used today in lead acid batteries are commonly composed of phenol-aldehyde impregnated cellulose sheets, sintered polyvinyl chloride or highly filled polyethylene. Separators prepared from phenol-aldehyde impregnated cellulose sheets, as described for example in U.S. Pat. Nos. 3,272,657 and 3,247,025 have been used extensively in lead acid batteries which had antimony as one component of the grid alloy. Sintered polyvinyl chloride based separators have also been used extensively in batteries having lead-antimony alloyed grids. The development of maintenance free batteries based on grid alloys which do not contain antimony has required the development of a separator having a small pore structure, good chemical resistance to oxidative attack within the battery, good flexibility and capable of being heat sealed. Separators which meet the above criteria are described in U.S. Pat. Nos. 3,351,495 and 4,024,323. Both of these patents describe battery separators which are composed of an ultra high molecular weight polyolefin, a siliceous filler and a petroleum oil and prepared by extruding the mixture of materials and then extracting most of the petroleum oil. Separators prepared in this fashion have maximum pore sizes of less than 1 micron, are typically 50-55% porous and also exhibit relatively low electrical resistance which is a desirable property. Phenol-aldehyde impregnated cellulosic webs have not been widely used with maintenance free batteries based on antimony free alloys because of their relatively poor resistance to oxidative attack in the battery, their large pore size, their high electrical resistance and the fact that they cannot be folded around the bottom of the plate and sealed on the sides.

German Offenlegunsschrift No. 2509823 described a battery separator composed of glass fiber, thermoplastic polymeric fibers and silica gell material which must be heated under specified pressure to yield the desired product. More specifically, the glass fibers in German Offenlegunsschrift No. 2509823 must have a diameter in the range of 0.0078"–0.16", a length in the range of 0.0039"–0.160" and have an average length of 0.024"; the termoplastic polymeric fiber must have a diameter in the range of 0.20"–1.18" and a length in the range of 0.040"–0.080"; the silica gel material must have a particle size of less than 10 microns and the ratio of glass fiber to polymeric fiber in the product must be in the range of 1:1.5–1:2.0 and the ratio of the sum of the fibers to silica gell material must be in the range of 1:0.5–1:1. Webs prepared according to such a formula tend to have less tensile strength than those of the present invention due to among other things the absence of fibers having lengths of 0.25" or greater and such prior art webs also tend to have low tear strengths. Webs of such prior art types are typically used in conjunction with stiff glassmats and are in fact physically glued to the glassmats.

It is an object of the present invention to provide a fiberous battery separator.

It is another object of the present invention to provide a battery separator that can be prepared on a typical paper machine which has a significantly smaller maximum pore size than conventional cellulosic fiber based battery separator webs.

It is a further object of the present invention to provide a battery separator which can be prepared on a paper machine that has good flexibility so that it can be folded around the bottom of a lead battery plate without cracking.

It is yet another object of the present invention to provide a battery separator which can be prepared on a paper machine that can be sealed either by heat or ultrasonic welding.

It is another object of the present invention to provide a battery separator which can be prepared on a paper machine in which the ribs can be thermomolded onto the separator.

It is a further object of the present invention to provide a battery separator which can be prepared on a paper machine which has a tensile strength greater than 8.0 lbs./in. in the machine direction.

It is a further object of the present invention to provide an expeditious method for manufacturing the battery separator web of the present invention economically.

SUMMARY

By an aspect of the invention a battery separator is provided having about 30 to about 70 weight percent polyolefin synthetic pulp, about 15 to about 65% siliceous filler and about 1 to about 35 weight percent of long fibers having lengths of at least about 0.1 inch. Preferably at least 1% of the long fibers are comprised of polyester. In one preferred form of the battery separator the long fibers are comprised of 1 to 15% weight percent of polyester fibers and 0 to 35 weight percent of glass fibers. In a preferred form of the battery separator about 0.5 to about 10 weight percent cellulose is included. Preferably the polyolefin is polyethylene and the siliceous filler is comprised of amorphous silica with a specific surface area of at least 100 $m^2/g$, and the median pore size is less than 10 microns and the maximum pore size is less than 27 microns. In one preferred form the battery separator contains about 0.02 to about 0.15 weight percent of a cationic copolymer containing acrylamide and about 0.02 to about 0.15 weight percent of an anionic copolymer containing acrylamide.

By another aspect of the invention a process is provided for manufacturing a web comprised of polyolefin fibers and siliceous filler comprising forming an aqueous slurry composition comprising said polyolefin fibers and said siliceous filler and an ionic agent and dewatering said composition. The preferred ionic agent includes a cationic agent and an anionic agent and preferably ionic agents are added sequentially. More preferably the ionic agent is a polymer containing acrylamide comprised of a cationic copolymer containing acrylamide, and an anionic copolymer containing acrylamide, and the polyolefin fibers and siliceous fillers are slurried first followed by the addition of the cationic copolymer which is followed by the addition of the anionic copolymer.

FIG. 1 is a schematic view of the laboratory rotoformer paper making machine and related equipment used for practicing the process of the present invention.

PREFERRED EMBODIMENT

Unless otherwise stated, percents in this application are by weight based upon 100% end composition weight. Thus 10% by weight means that the component constitutes 10 wt. parts out of every 100 wt. parts of total composition.

The present invention is a battery separator comprised of a mixture of 30 to 70% polyolefin synthetic pulp, 15 to 65% of a siliceous filler and 1 to 35% of long fibers that are at least 0.1 inch long.

By synthetic pulp it is meant a short polyolefin based predominantly fibrous material having fiber size and shape similar to cellulosic wood pulps. For example the fiber lengths typically average 1 to 4 millimeters for synthetic pulp and 0.5 to 5 millimeters for wood pulp. Fiber lengths are measured according to TAPPI standard T232.

The polyolefin synthetic pulp is preferably a polyethylene or polypropylene synthetic pulp, more preferably a polyethylene synthetic pulp. Such synthetic pulps are described in a number of U.S. Pat. Nos. including numbers 3,743,272; 3,891,499; 3,902,957; 3,920,508; 3,987,139; 3,997,648; 4,007,247 and 3,995,001. The preferred polyethylene is desirably a low pressure polyethylene having a viscosity average molecular weight range of 20,000 to 2,000,000 as described in U.S. Pat. No. 3,920,508 column 8, lines 21–31 and 39–51. The synthetic pulp fibers may optionally contain a water dispersing agent. It has been found in the present invention, that the most preferred synthetic pulps are those having the highest degree of branching or fibrillation. Polyolefin fibers of the above type are commercial products.

The siliceous filler is preferably an amorphous silica having a particle size in the range of about 0.01 microns to about 20 microns, more preferably in the range of about 1 to about 15 microns; a surface area in the range from about 30 to 950 sq. meters per gram and preferably greater than about 100 meters$^2$ per gram, and a pore volume of greater than about 0.75 cc per gram. Other fillers which meet the above criteria are diatomaceous earths.

The preferred long fibers are polyester, glass and acrylic, more preferably polyester and glass and most preferably polyester with polyethylene terephthalate being preferred.

The polyester and acrylic fiber are preferably typical paper making staple fiber having a denier ranging from about 1.5 to about 12 and a length ranging from about 0.25 inches to about 1.0 inches. These fibers tend to be circular in cross sectional shape, and have smooth surfaces in contrast to the polyolefin fibers described earlier which have an irregular cross sectional shape and have highly fibrillated surfaces. These fibers may optionally have on their surface a surfactant to aid their dispersion in water.

The glass fiber should have good chemical resistance in sulfuric acid as evidenced by low weight loss on extended exposure to hot sulfuric acid. Glass which has good chemical resistance will typically lose less than about 2% of its weight after 7 days of exposure to 1.265 sp. gr. sulfuric acid maintained at 180° F.

The diameter of the glass fiber may range from about 1 to about 7 microns, but preferably will range from about 5 to about 7 microns and have a length in the range from about 0.1 inch to about 1.0 inch but preferably from about 0.25 inch to about 0.5 inch. The glass may optionally be treated with a surfactant to improve its water dispersability prior to being used in the present invention.

The cellulosic fibers may be any conventional paper making fibers. The preferred fibers would be those prepared by conventional chemical pulping procedures.

In the present invention it has been found desirable to employ low levels of alum (aluminum sulfate) to reduce the pH of the water in the hydropulper and chest prior to forming the web on the paper machine to improve the dispersion of the fibers and filler and also to improve the efficiency of the retention aids. Alum is defined here to be any paper making grade of aluminum sulfate which is preferably available in granular form.

In the present invention, it has been found desirable to use retention aids to improve the rate at which the siliceous filler is retained in the web during the paper making operation. It has been particularly advantageous to use a two component retention aid system, wherein each is added separately and at some distance apart from each other. Retention aids which have been particularly useful in the present invention are those based on cationically or anionically modified high molecular weight polyacrylamides. Preferably the cationic agent is added first. The retention aids are preferably used at levels ranging from about 0.01 weight percent to about 1.0 weight percent based on the weight of the solids in the slurry formed during processing to form the web. The preferred range is 0.04 to 0.75 weight percent. Preferably the cationic copolymer is added in an amount ranging from 0.01 to 0.50% and more preferably 0.02 to 0.15%. The anionic copolymer is preferably added at the same rate. The residual ionic agent content in the battery separator is preferably 0.02 to 1.0%, more preferably 0.01 to 0.15% of cationic copolymer containing acrylamide and 0.01 to 0.15% of anionic copolymer containing acrylamide.

Other aids such as wet strength resins and the like are also useable and within the broad purview of the invention.

The battery separator preferably has a median pore size of less than 10 microns and a maximum pore size of less than 27 microns. Preferably the vacuum electrical resistance is less than 20 milliohms·square inch.

The electrical resistance of the battery separator of the present invention may be improved by treatment with surfactants such as bis(alkyl)sulfoserccinate monovalent salts, aryl nonionic surfactants such as alkylaryl polyethylene glycol, alkyl polyethylene glycol, polyethylene propylene glycols, and other surfactants which have been used by those skilled in lead acid battery development. The level of surfactant employed may range from trace amounts up to about 1% by weight. The specific level used will depend upon the specified surfactant, but is in practice limited to those levels which do not have any adverse effect on battery performance or battery life.

DRAWING

The laboratory rotoformer paper making machine used in the Examples is depicted in FIG. 1. A full size scale-up onto a Fourdrinier machine has also been carried out without difficulty in plant trials. One difference in operation in the plant trials is that the siliceous filler was added to the pulper in its shipping bags. This eliminated dust and provided the cellulosic fiber, calculated at about 2% of a final web weight basis.

The paper machine of FIG. 1 has a pulper 10, a transfer pump 12 in a transfer line 13 and chest 14. The chest 14 is emptied by transfer line 15 by pump 16. Part of the material in transfer line 15 is recirculated via inlet 17 to chest 14 and the other part passes thorugh the metering stuff gate 18 into a dilution box 20. The cationic agent metering device 21 is between the stuff gate 18 and the dilution box 20. The anionic agent metering device 22 is about 3 feet downstream in the dilution box 20 which is about 5 feet long. The diluting water is fed into the dilution tank at 23.

The diluted slurry is pumped by pump 24 from the dilution box via transfer line 25 into the head box 16. The rotorformer drum 27 rotates in the head box picking up the slurry and forming a web. Two vacuum boxes 28 and 29 are present. A lump breaker 30 opposite drum 27 is provided for optional use.

The web is removed from the rotoformer drum 27 and passed over a felt 31. Calandar means 32 and 33 are associated with the felt conveying means for optionally pressing the web. The felt conveying means 31 feeds the oven 34 which feeds onto a first heated can 35. There are 7 heated cans 35, 36, 37, 38, 39, 40 and 41 in sequence. An 8th can 42 is not heated. The cans feed to a wind-up station 43.

PROCESS

Turning now to the process for manufacturing the battery separator of the present invention. An aqueous slurry composition comprised of the polyolefin fibers and the siliceous filler and an ionic agent is prepared. The slurry composition preferably is comprised of 30 to 70% of polyolefin fibers as a synthetic pulp and 15 to 65% of a siliceous filler that includes an amorphous silica. In preferred forms glass and cellulosic fibers are added to the aqueous slurry.

The preferred ionic agent added to the slurry is comprised of a cationic copolymer containing acrylamide and an anionic copolymer containing acrylamide. Preferably the polyolefin fibers and siliceous filler are slurried first followed by the addition of the cationic copolymer which is followed by the addition of anionic copolymer. The cationic copolymer is preferably metered into the slurry on an end product slurry solids weight basis in an amount ranging from 0.01 to 0.50, more preferably 0.02 to 0.15, weight percent and the anionic copolymer is an amount from 0.01 to 0.50, more preferably 0.02 to 0.15 weight percent.

Preferably alum is also added to the aqueous slurry composition in an amount ranging from about 1 to about 5%.

The process also preferably includes pressing the composition to reduce pore size. Preferably the composition is pressed at a temperature of less than 220° F.

EXAMPLE 1

A pulp was formed in a pulper by charging 1000 lbs. of water to the pulper followed by 37.6 lbs. of short fibered synthetic polyolefin pulp with average length of 1 mm, cross section area on the order of a few square microns and specific surface area on the order of 10 $m^2/g$. polyethylene fibers (PULPEX A product of Solvay & Cie). This was pulped for about $25\pm5$ minutes. The 36 lbs. of siliceous filler, amorphous silica (Hi Sil 233 product of PPG Industries) was added. The filler was wet down before addition to provide dust reduction.

After the silica was added the pulper was operated for an additional 5 for 10 minutes to mix well. Then 800 lbs. of additional water was added to aid in more complete mixing and to flush out the pulper.

The pulper contents were transferred to the chest of a laboratory rotoformer paper machine. Then 6.4 lbs. of long fibers were added. The long fibers were polyethylene terephthalate staple fibers 1.5 denier$\times\frac{1}{4}''$ supplied by Minifibers, Inc. Thereafter about 5500 lbs. of water was added. Next 1.6 lbs. of ground paper makers alum (alum sulfate iron free ground product of DuPont) was added to adjust the pH to 4.5 to 5.5 After thorough mixing and disolving of the alum the slurry was allowed to stand for about 1 hours. Then the aqueous slurry was transferred from the chest to a dilution box just upstream of the headbox. The rate of transfer by pumping was set to yield a web having a grammage of 120 g/$m^2$.

The mix was diluted with water in the dilution box to about 0.06 weight percent solids. A cationic copolymer containing acrylamide (RETEN 210 ® a product of Hercules Inc.) was metered in at the stuff gate, which is where the chest flurry from the flows into the mixing box, at a concentration of 0.04% in water at 800 ml/minute. An anionic copolymer containing acrylamide (RETEN 421 ® a product of Hercules, Inc.) was metered into the mix box about 3 feet downstream of its 5 foot length at a concentration of 0.025% in water at 800 ml/minute. The ionic copolymers containing acrylamide functioned as retention aids causing the silica filler to become associated with the synthetic pulp present in the aqueous slurry.

This diluted mix was then transferred to the head box where the web is formed on the rotoformer. While on the rotoformer a lump breaker roll operated at 80 psi to smooth out the top surface of the web. The wire of the rotoformer travelled at a rate of 15 feet/minute.

After leaving the rotoformer and while still resting on a moving belt the web was pressed by opposing hard rolls to reduce the caliper and pore size and increase the strength of the web. The caliper or thickness was reduced to 14 mils.

The web was then transferred from the wire to an open mesh metal belt and passed through an oven where it was dried to a water content of about 10 lbs. of water for every 10 lbs. of solid web. It was not necessary to heat the oven.

From the oven the web was transferred to steam cans (drums having circumferences of about 12 feet) operated at surface temperatures of about 270° F. and substantially completely dried on the first three cans. The web was then passed over four more cans also operated at surface temperatures of about 270° F. and the fiber bonding increased. It is believed this bonding is by some melting of the polyolefin fibers at the fiber junctions. Rubbing of the web with the finger nail showed increased web integrity.

The web was then wound up and afterwards cut to desired separator sizes.

EXAMPLE 2

The procedure of Example 1 was carried out except as follows: 42 lbs. of the synthetic pulp, 38 lbs. of the filler and 10 lbs. of the long fiber were used. In addition 10 lbs. of cellulose (bleached sulfite pulp with average fiber length of 2.2 mm, a product of Rayonier, Inc.) were added with the synthetic pulp and 4 lbs. of wet strength resin (Kymene 557 H, a product of Hercules, Inc.) was added to the chest after the long fibers. The alum and the ionic copolymers containing acrylamide were omitted. The rate of transfer to the dilution box was set to yield a grammage of 115 gr/m$^2$. The web was pressed to a caliper of 12 mils.

EXAMPLE 3

The procedure of Example 2 was carried out except as follows: 24 lbs. of the synthetic pulp, 30 lbs. of the filler, 6 lbs. of the long fiber, 3 lbs. of the cellulose and 2.4 lbs. of the web strength resin were used. The rate of transfer to the dilution box was set to yield a grammage of 120 g/m$^2$. The web was pressed to a caliper of 13 mils.

EXAMPLE 4

The procedure of Example 3 was carried out except as follows: 90 lbs. of the synthetic pulp, 50 lbs. of filler, 6 lbs. of the long fiber, 24 lbs. of the cellulose, 8 lbs. of the wet strength resin and 4 lbs. of the alum of Example 1 were used. The filler was composed of 20 lbs. of the amorphous silica and 30 lbs. of diatomaceous earch (Celite 266 a product of Johns-Manville), 30 lbs. of glass fiber (Tempstran D a product of Johns-Manville with diameter of 5.1 to 6.4 microns and an average length of ¼ in) was added into the chest right before or after the polyester long fiber. The rate of transfer to the dilution box was set to yield a grammage of 185 g/m$^2$. The wet web was not pressed so as to maintain a higher caliper and hence stiffness. The webs increased thickness imparted by the glass fiber necessitated heating the oven to 400° F. to reduce the water content to about 5 lb. of water for every 10 lb. of solid web.

EXAMPLE 5

The procedure of Example 4 was carried out except as follows: 100 lbs. of synthetic pulp, 55 lbs. of the filler of Example 1, 15 lbs. of the long fiber, 30 lbs. of the glass fiber, 8 lbs of the wet strength resin and 4 lbs. of the alum were used. The cellulose was omitted. The rate of trnasfer to the silution box was set to yield a grammage of 174 g/m$^2$.

EXAMPLE 6

The procedure of Example 3 was carried out except as follows: 48 lbs. of synthetic pulp, and 42 lbs. of the filler, 10 lbs. of the long fiber, 4 lbs. of the wet strength resin and 2 lbs. of the alum of Example 1 were used. The cellulose was omitted. The rate of transfer to the dilution box was set to yield a web with a grammage of 126 g/m$^2$. The web was pressed to a caliper of 14 mils.

EXAMPLE 7

The procedure of Example 4 was carried out except as follows: 30 lbs. of the synthetic pulp, 15 lbs. of the diatomaceous earth of Example 4 and 15 lbs. of the cellulose were used. The polyester long fiber and the glass long fiber and the wet strength resin and alum were omitted. The rate of transfer to the dilution box was set to yield a web with a grammage of 144 g/m$^2$.

EXAMPLE 8

The procedure of Example 4 was carried out except as follows: 50 lbs. of synthetic pulp, 20 lbs. of the filler of Example 7, 15 lbs. of the cellulose, and 5 lbs. of glass fiber were used. The synthetic pulp was SWP® grade E-790 a product of Crown-Zellerbach Corporation, the average fiber length was 1.6 mm. The polyester fiber and the wet strength resin and alum were omitted. The rate of transfer to the dilution box was set to yield a grammage of 145 g/m$^2$.

EXAMPLE 9

The procedure of Example 4 was carried out except as follows: 36 lbs. of the synthetic pulp, 9 lbs. of the filler and 15 lbs. of the cellulose were used. The polyester long fiber, the glass fiber and the wet strength resin and alum were omitted. The rate of transfer was set to yield a grammage of 145 g/m$^2$.

EXAMPLE 10

The procedure of Example 4 was carried out except as follows: 30 lbs. of the synthetic pulp, 7.5 lbs. of the silica of Example 1, 11.25 lbs. of the diatomaceous earth of Example 4, 1 lb. of cellulose, 3 lbs. of the wet strength resin and 1½ lbs. of alum were used. The rate of transfer was set to yield a grammage of 167 g/m$^2$.

The battery separator produced by the above methods were tested and the results are tabulated in Table 1. The percentages of the constituents listed in the furnish equal 100% and ignore the small, several percent, of residual processing aids and the like added during processing.

The testing used in establishing the value in Table 1 was carried out as follows:

- Tensile—A Scott Tester using a sample width of 1 inch and a 2 inch jaw separation, and a cross head speed of 12"/min.
- Puncture—Standard battery industry testing procedure.
- Stiffness—Gurley stiffness tester.
- Tear—Elmendorf tear tester.
- Densometer—Gurley densometer.
- Maximum Pore Size—Bubble test ASTM F316-70.
- Acid wt. loss—a piece of web was weighed and then placed in 1.265 specific gravity sulfonic acid and boiled for 3 hours and then weighed again.

TABLE I

| Example | Synthetic Pulp (%) | Filler (%) | Polyester (%) | Glass (%) | Cellulose (%) | Grammage (gr/m²) | Thickness Caliper (mils) | MD/CMD[a] Tensiles (lb./in.) | Puncture (gr) | Stiffness (mg) | Tear (g) | Densometer (sec) | Max. Pore Size (μ) | Vacuum Elec. Res. (mΩ) × in.² | Acid Weight Loss (%) |
|---|---|---|---|---|---|---|---|---|---|---|---|---|---|---|---|
| 1 | 47 | 45(s) | 8 | | | 118 | 14 | 9.3/5.3 | — | — | — | 193 | 11.1 | 12.7 | — |
| 2 | 42 | 38(s) | 10 | | 10 | 115 | 12 | 10.3/5.7 | 618 | — | 99/159 | 128 | 12.8 | 17.3 | 8.5 |
| 3 | 38 | 47.5(s) | 9.5 | | 5 | 120 | 13 | 5.6/2.9 | 318 | — | 79/107 | 96 | 13 | 11.7 | 6.2 |
| 4 | 45 | 25(s+d) | 3 | 15 | 12 | 185 | 23 | 14/8.6 | 485 | 2985/1460 | 95/129 | 100 | 20.1 | 21.6 | 9.8 |
| 5 | 50 | 27.5(s) | 7.5 | 15 | | 174 | 25 | 7.8/5.2 | 556 | 1638/1077 | — | 57 | 23.5 | 12.3 | — |
| 6 | 48 | 42(s) | 10 | | | 126 | 14 | 8.3/5 | 674 | — | 104/130 | 336 | 11 | 12.2 | 1.7 |
| 7 | 50 | 25(d) | | | 25 | 144 | 19.5 | 9/6.8 | 462 | 991/519 | 78/79 | 57 | 21.2 | 25.3 | 15.1 |
| 8 | 50 | 30(d) | | 5 | 15 | 145 | 17.5 | 7.8/6.8 | 492 | 1050/632 | — | 19.5 | 26.4 | 19.7 | 14.6 |
| 9 | 60 | 15(s) | | | 25 | 145 | 19.5 | 15.8/11 | 627 | 1210/641 | 87/110 | 51 | 22.4 | 28.1 | 16 |
| 10 | 40 | 25(s+d) | 1 | 22 | 12 | 167 | 22.5 | 13.4/7.1 | 310 | 2270/1166 | — | 43 | 24.5 | 19.2 | 10.4 | a: machine direction/cross machine direction
s: silica
d: diatomaceous earth

TABLE 1

Table 1 illustrates a number of points among them:
(1) Any formulations with cellulosic contents exceeding 10% would have an acid weight loss greater than 10% which is not desirable.
(2) In cases where there is no long fiber in the formulation e.g. polyester or glass fiber, such as in Example 7, the tear strength was low.
(3) For the same grammage, formulations with higher silica levels have lower electrical resistances.

It is claimed:

1. A lead acid battery separator comprising about 30 to about 70 weight percent of a fiberous polyolefin synthetic pulp, about 15 to about 65 weight percent of a particulate siliceous filler having a particle size of about 0.01 to about 20 microns and about 1 to about 35 weight percent of long paper making staple fiber having a length of at least about 0.25 inch, a denier of about 1.5 to about 12 and chosen from the group consisting of polyethylene terephthalate polyester fibers, acrylic fibers and mixtures thereof.

2. The lead acid battery separator of claim 1 wherein said polyolefin is polyethylene and at least some of the fibers of the polyethylene synthetic pulp are at least partially melt bonded and said long fibers include glass fibers having a diameter of about 1 to about 7 microns with a combined long fiber upper limit in said battery separator of about 35 weight percent.

3. The lead acid battery separator of claim 2 comprising about 0.5 to about 10 weight percent cellulosic fiber and wherein at least 1 weight percent of said long paper making staple fiber is comprised of polyethylene terephthlate polyester and said synthetic pulp has an average fiber length of about 1 to about 4 millimeters.

* * * * *